June 26, 1923.

O. S. BOWMAN

TRIUNE HEAT EQUIPMENT FOR THE HOME

Filed May 13, 1922

1,459,762

INVENTOR.
OLIVER S. BOWMAN
BY
Fred E. Mefford
ATTORNEY.

Patented June 26, 1923.

1,459,762

UNITED STATES PATENT OFFICE.

OLIVER S. BOWMAN, OF COLORADO SPRINGS, COLORADO.

TRIUNE HEAT EQUIPMENT FOR THE HOME.

Application filed May 13, 1922. Serial No. 560,764.

*To all whom it may concern:*

Be it known that I, OLIVER S. BOWMAN, a citizen of the United States, and a resident of Colorado Springs, in the county of El Paso and State of Colorado, have invented a new and useful Triune Heat Equipment for the Home, of which the following is a specification.

My invention relates to devices for the generation and utilization of heat and has for its major object, the provision of a single unit having facilities, (1) for heating the premises, (2) for cooking, and (3) for heating water for domestic use. Other objects will appear as the description progresses.

Although I have shown the preferred form of my invention in the accompanying drawings and recommend its use, yet I do not limit myself to the precise form as here-in shown, but wish it understood that various adaptions and minor details of construction may be made within the scope of what hereinafter is claimed, without departing from the spirit of the invention.

Similar reference characters refer to like parts throughout the several views.

Figures 1, 2, 3, 4:
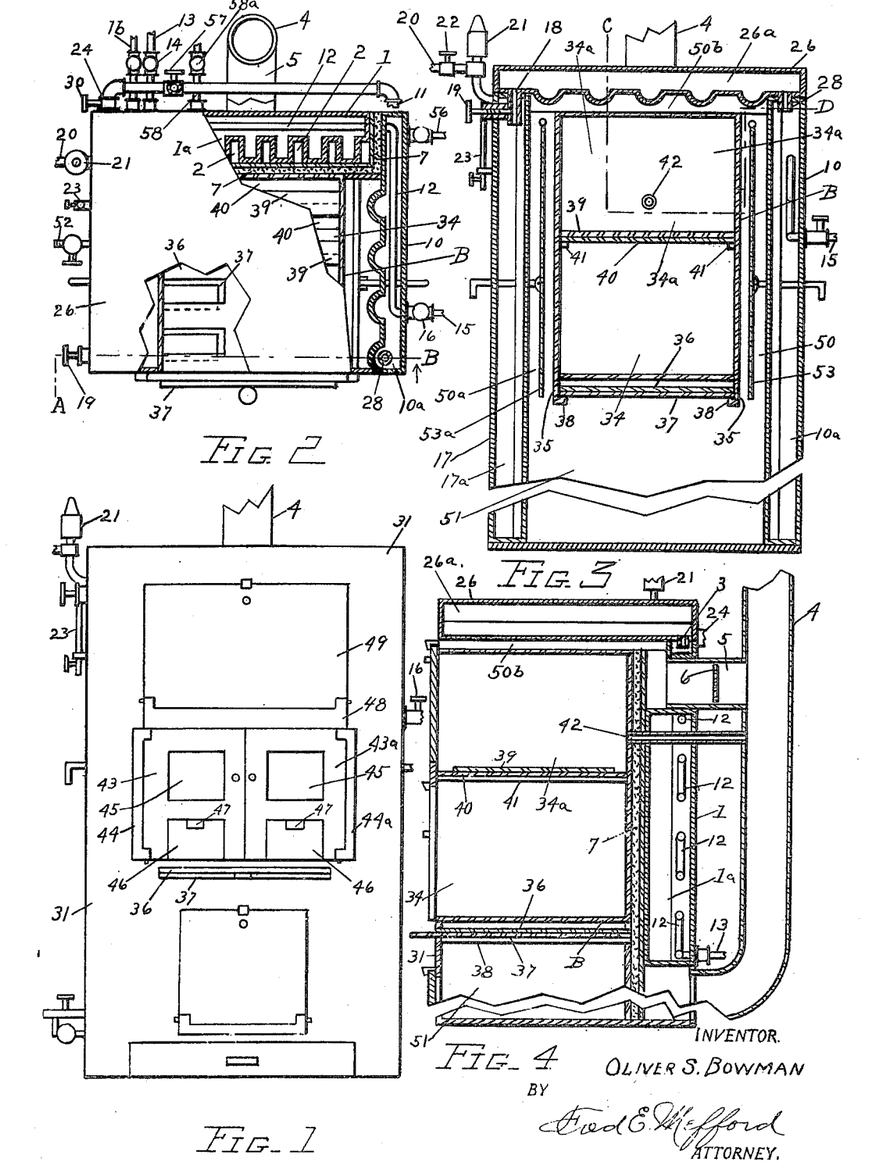
Figure 1 represents a front elevation of the invention.
Figure 2, a plan view, partly broken away, (one portion being broken along the line B—C Figure 3)
Figure 3, a vertical section on the line A—B of Figure 2, (partly broken away)
Figure 4, a vertical section through the center of the invention, (partly broken away).

The side walls 10 and 17, the rear wall 1 and the top wall 26 are constructed hollow, as indicated in the drawings, each wall comprising a separate water chamber (10$^a$, 17$^a$, 1$^a$, and 26$^a$ respectively); said chambers being connected in a manner to provide a unique circulation system, the purposes of which are hereinafter disclosed. Said walls, together with front wall 31, comprise a chamber, in which is disposed the rectangular box B, (comprising the cooking compartments) in such position that channels 50, 50$^a$ and 50$^b$ are formed.

A coil, 12, disposed upwardly within water chamber 1$^a$ and extending therefrom into water chamber 10$^a$, is connected with the household water supply by valve-controlled pipe 13 and with the domestic hot water system by valve-controlled pipe 15.

39 and 40 are grids supported on cleats 41, which divide box B into cooking compartments 34 and 34$^a$; 42, fume outlet pipe; 43, 43$^a$, horizontally swinging main doors, having therein transparent windows 45, and supported on hinges 44—44$^a$; 46, vertically-swinging auxiliary doors, having notches in the upper ends thereof, hinged in the lower parts of said main doors; 47, vertically-moving slides in said main doors adapted to fit into said notches; 48, horizontally-swinging bar pivoted on the top of hinge 44$^a$; 49, vertically-swinging door hinged to bar 48; 36 and 37, grids disposed on cleats 38 on extensions 35.

Valve-controlled pipe 20, a pop-off 21 and water gauge 23 are mounted on side wall 17, and valve-controlled pipe 56 is mounted on side wall 10, for purposes hereinafter explained.

Horizontal conduit 5, having damper 6 therein, extends thru back wall 1 and opens into exit conduit 4.

Dampers 53 and 53$^a$, are hung within channels 50 and 50$^a$.

The front wall of water chamber 1$^a$ comprises a series of vertical grooves. Insulation wall 7, extending across the ends of said water chamber, is disposed in front of said grooves, thereby forming downwardly-extending flues 2, having open communication above with channels 50, 50$^a$ and 50$^b$ and below with exit conduit 4. (The major function of wall 7 is to insulate water chamber 1$^a$ from the combustion devices and from compartments 34 and 34$^a$.)

Water chamber 1$^a$, having a valve-controlled inlet pipe at its base, has open communication at the top with water chamber 26$^a$, through nipple 3, and is connected at its extreme front, with water chambers 10$^a$ and 17$^a$ respectively by nipples 28 and 18 (the latter having therein a valve 19); water chambers 10$^a$ and 17$^a$ have separate communication with the radiator system via pipes 11 and 24 (having therein central valve 30) respectively.

My invention, which may be adapted to burn gas, oil, coal or other fuel, operates as follows:

The gases of combustion pass upward through channels 50 and 50$^a$, backward through channel 50$^b$, downward through flues 2, and into exit conduit 4. By opening damper 6 the gases may be passed directly from channel 50$^b$, via conduit 5, into exit conduit 4.

The water in a closed-cycle heating system is maintained under relatively low and constant pressure, while a device which provides a continuous supply of hot water for domestic purposes requires an intake port in open communication with the water main wherein the pressure constantly fluctuates. The water circulating in my heating system and the water to be heated for domestic purposes are therefore maintained separately.

The return water from the radiator system enters water chamber 1ª through valve-controlled pipe 1ᵇ, flows upward therein and through nipple 3 into water chamber 26ª, thence flows forward therein and passes through nipples 28 and 18 into water chambers 10ª and 17ª. The movement of the water, from its entrance into water chamber 1ª to its exit from water chamber 26ª, is thus counter to the movement of the gases of combustion through channel 50ᵇ and flues 2. The water finally passes from chambers 10ª and 17ª, through pipes 11 and 24, again into the radiator system.

The water heated in coil 12, for domestic purposes does not receive heat direct from the gases of combustion, but from the water in chambers 1ª and 10ª. The movement of the water through coil 12, is upward and therefore counter to the movement of the gases of combustion. I thus provide means by which two bodies of water are caused to flow counter to the gases of combustion and are heated by a single device.

When the heating system is not needed, hot water for domestic purposes may be derived (via pipe 56) from water chamber 10ª, by closing communication between said chamber and the radiator system (by means of valve 57) and between coil 12 and the water mains (by means of valve 14,) and then opening communication between the mains and water chamber 1ª, (by means of pipe 58 and valve 58ª).

Water chamber 17ª is convertible into a low pressure steam generator, by closing valve 19 (thereby stopping the inflow of water from chamber 26ª) and valve 30 (thereby stopping the outflow into the radiator system). The water thus trapped in 17ª may be heated to the required temperature, (regulated by pop-off 21) and, when valve 22 in pipe 20 is opened, steam may be trapped in a suitable drum (not shown). This implies that the walls of 17ª be constructed to withstand the pressure.

Rectangular box B, (disposed, as hereinbefore described, in the chamber formed by walls 1, 10, 17, 26 and 31) comprises the cooking element of my invention. The bottom of this box, which is divided into compartments 34 and 34ª by grids 39 and 40, rests directly above the fire and is therefore analagous to the top of a cook stove or range, while compartment 34ª comprises the bake oven. Horizontal bar 48, supporting door 49, is hinged to swing outward, thus permitting the opening of the entire front of the cooking element. Main doors 43 and 43ª (having therein transparent windows 45) contain auxiliary doors 46, which permit the insertion of small cooking utensils, the handles of which may project thru the notches in doors 46. Pipe 42, communicating between the cooking members and exit conduit 4, permits the cooking of onions, cabbage and other edibles which emit more or less offensive odors, without disagreeable consequences.

Grids 36 and 37, one of which is movable, are adapted to regulate the area of the bottom of box B directly exposed to the fire, and therefore the temperature in cooking compartments 34 and 34ª. Swinging dampers 53 and 53ª are also adapted to regulate the temperature in the cooking compartments; the ascending gases of combustion being deflected to or from the walls of said compartments, by swinging these dampers inward or outward.

I claim:

1. In an equipment of the class described, in combination; a rear wall, comprising a vertical water chamber, having vertical grooves in the front thereof; an insulation wall disposed in front of said grooves, thereby forming downwardly-extending flues; for the purposes set forth.

2. In an equipment of the class described, in combination; a rear wall, comprising a vertical water chamber, having vertical grooves in the front thereof; an insulation wall disposed in front of said grooves, thereby forming downwardly-extending flues; a coil having an intake port at the lower end of an outlet port, at the upper end thereof, disposed upwardly in said water chamber; for the purposes set forth.

3. In an equipment of the class described, in combination; a rear wall comprising a vertical water chamber, having an intake port in the base and vertical grooves in the front thereof; an insulation wall disposed in front of said grooves, thereby forming down draft flues; a horizontal conduit, having a damper therein, extending through said rear wall; a coil, having an intake port at the bottom and an outlet port at the top thereof, disposed upwardly within the water chamber in said rear wall; for the purposes set forth.

4. In an equipment of the class described, in combination; a rear wall, comprising a vertical water chamber, having an intake port in the base and vertical grooves in the front thereof; an insulation wall disposed in front of said grooves, thereby forming down draft flues; a horizontal conduit, having a damper therein, extending through said rear wall; a top wall, comprising a horizontal water chamber having means for communication with the water chamber in said rear wall; a coil, having an intake port at the bottom and an outlet port at the top thereof, disposed upwardly within the water chamber in said rear wall; for the purposes set forth.

5. In an equipment of the class described, in combination; a rear wall comprising a vertical water chamber, having an intake port in the base and vertical grooves in the front thereof; an insulation wall disposed in front of said grooves thereby forming down draft flues; a top wall, comprising a horizontal water chamber having means of communication with the water chamber in said rear wall; a coil having an intake port at the bottom and an outlet port at the top thereof, disposed upwardly within the water chamber in said rear wall; for the purposes set forth.

6. In an equipment of the class described, in combination; a rear wall comprising a vertical water chamber, having an intake port in the base and vertical grooves in the front thereof; an insulation wall disposed in front of said grooves, thereby forming down draft flues; a horizontal conduit, having a damper therein, extending through said rear wall; a top wall, comprising a horizontal water chamber having means of communication with the water chamber in said rear wall; for the purposes set forth.

7. In an equipment of the class described, in combination; a rear wall comprising a vertical water chamber, having an intake port in the base and vertical grooves in the front thereof; an insulation wall disposed in front of said grooves thereby forming down draft flues; a top wall, comprising a horizontal water chamber having means of communication with the water chamber in said rear wall; side walls, comprising vertical water chambers, each having means of communication with said horizontal water chamber, and an outlet port adapted to be connected to a radiator system; for the purposes set forth.

8. In an equipment of the class described, in combination: a rear wall, comprising a vertical water chamber, having an intake port in the base and vertical grooves in the front thereof; an insulation wall disposed in front of said grooves, thereby forming down draft flues; a top wall, comprising a horizontal water chamber having means of communication with the water chamber in said rear wall; side walls, comprising vertical water chambers, each having means of communication with said horizontal water chamber, and an outlet port adapted to be connected to a radiator system; a coil, having an intake port at the lower end and an outlet port at the upper end thereof, disposed upwardly within the water chamber in said rear wall and extending into the water chamber in one of said side walls; for the purposes set forth.

9. In an equipment of the class described, in combination; a rear wall comprising a vertical water chamber, having an intake port in the base and vertical grooves in the front thereof; an insulation wall disposed in front of said grooves, thereby forming down draft flues; a horizontal conduit having a damper therein, extending through said rear wall; a top wall, comprising a horizontal water chamber having means of communication with the water chamber in said wall; side walls, comprising vertical water chambers, each having means of communication with said horizontal water chamber, and an outlet port adapted to be connected to a radiator system; a coil, having an intake port at the lower end and an outlet port at the upper end thereof, disposed upwardly within the water chamber in said rear wall and extending into the water chamber in one of said side walls; for the purposes set forth.

10. In an equipment of the class described, in combination; a rear wall comprising a vertical water chamber, having an intake port in the base and vertical grooves in the front thereof; an insulation wall disposed in front of said grooves, thereby forming down draft flues; a horizontal conduit, having a damper therein, extending through said rear wall; a top wall, comprising a horizontal water chamber having means of communication with the water chamber in said rear wall; side walls, comprising vertical water chambers, each having means of communication with said horizontal water chamber, and an outlet port adapted to be connected to a radiator system; one of said side walls, having valves in the inlet and outlet ports (adapted to trap the water therein) and a water gauge; a pop-off and a steam outlet mounted therein; for the purposes set forth.

11. In an equipment of the class described, in combination; a rear wall comprising a vertical water chamber, having an intake port in the base and vertical grooves in the front thereof; an insulation wall disposed in front of said grooves, thereby forming down draft flues; a top wall, comprising a horizontal water chamber having means of communication with the water chamber in said rear wall; side walls, comprising vertical water chambers, each having means of communication with said horizontal water chamber, and an outlet port adapted to be connected to a radiator system; one of said side walls, having valves in the inlet and outlet ports (adapted to trap the water therein) and a water gauge, a pop-off and a steam outlet mounted thereon; for the purposes set forth.

12. In an equipment of the class described, in combination; a rear wall comprising a vertical water chamber, having an intake port in the base and vertical grooves in the front thereof; an insulation wall disposed in front of said grooves, thereby forming down draft flues; a top wall, comprising a horizontal water chamber having means of communication with the water chamber in said rear wall; side walls, comprising vertical water chambers, each having means of communication with said horizontal water chamber, and an outlet port adapted to be connected to a radiator system; one of said side walls, having valves in the inlet and outlet ports (adapted to trap the water therein) and a water gauge, a pop-off and a steam outlet mounted thereon; a coil, having an intake port at the lower end and an outlet port at the upper end thereof, disposed upwardly within the water chamber in said rear wall and extending into the water chamber in one of said side walls; for the purposes set forth.

13. In an equipment of the class described in combination; a rear wall comprising a vertical water chamber, having an intake port in the base and vertical grooves in the front thereof; an insulation wall disposed in front of said grooves, thereby forming down draft flues; a horizontal conduit, having a damper therein, extending through said rear wall; a top wall, comprising a horizontal water chamber having means of communication with the water chamber in said rear wall; side walls, comprising vertical water chambers, each having means of communication with said horizontal water chamber, and an outlet port adapted to be connected to a radiator system; one of said side walls, having valves in the inlet and outlet ports (adapted to trap the water therein) and a water gauge, a pop-off and a steam outlet mounted therein; a coil, having an intake at the lower end and an outlet port at the upper end thereof, disposed upwardly within the water chamber in said rear wall and extending into the water chamber in one of said side walls; for the purposes set forth.

14. In an equipment of the class described, in combination; a rear wall comprising a vertical water chamber, having an intake port in the base and vertical grooves in the front thereof; an insulation wall disposed in front of said grooves thereby forming down draft flues; a top wall, comprising a horizontal water chamber having means of communication with the water chamber in said rear wall; side walls, comprising vertical water chambers, each having means of communication with said horizontal water chamber, and an outlet port adapted to be connected to a radiator system; a front wall, having suitable openings therein, disposed with said rear, top and side walls to form a rectangular chamber; for the purposes set forth.

15. In an equipment of the class described, in combination; a rear wall comprising a vertical water chamber, having an intake port in the base and vertical grooves in the front thereof; an insulation wall disposed in front of said grooves, thereby forming down draft flues; a top wall, comprising a horizontal water chamber having means of communication with the water chamber in said rear wall; side walls, comprising vertical water chambers, each having means of communication with said horizontal water chamber, and an outlet port adapted to be connected to a radiator system; a coil, having an intake port at the lower end and an outlet port at the upper end thereof, disposed upwardly within the water chamber in said rear wall and extending into the water chamber in one of said side walls; a front wall, having suitable openings therein, disposed with said rear, top and side walls to form a rectangular chamber; for the purposes set forth.

16. In an equipment of the class described, in combination; a rear wall comprising a vertical water chamber having an intake port in the base and vertical grooves in the front thereof; an insulation wall disposed in front of said grooves, thereby forming down draft flues; a horizontal conduit, having a damper therein, extending through said rear wall; a top wall, comprising a horizontal water chamber having means of communication with the water chamber in said rear wall; side walls, comprising vertical water chambers, each having means of communication with said horizontal water chamber, and an outlet port adapted to be connected to a radiator system; a coil, having an intake port at the lower end and an outlet port at the upper end thereof, disposed upwardly within the water chamber in said rear wall and extending into the water chamber in one of said side walls; a front wall, having suitable openings therein, disposed with said rear, top and side walls to form a rectangular chamber; for the purposes set forth.

17. In an equipment of the class described, in combination; a rear wall, comprising a vertical water chamber, having an intake port in the base and vertical grooves in the front thereof; an insulation wall disposed in front of said grooves, thereby forming down draft flues; a horizontal conduit, having a damper therein, extending through said rear wall; a top wall, comprising a horizontal water chamber having means of communication with the water chamber in said rear wall; side walls, comprising vertical water chambers, each having means of communication with said horizontal water chamber, and an outlet port adapted to be connected to a radiator system; one of said side walls, having valves in the inlet and outlet ports (adapted to trap the water therein) and a water gauge, a pop-off and a steam outlet mounted thereon; a front wall, having suitable openings therein, disposed with said rear, top and side walls to form a rectangular chamber; for the purposes set forth.

18. In an equipment of the class described, in combination; a rear wall comprising a vertical water chamber, having an intake port in the base and vertical grooves in the front thereof; an insulation wall disposed in front of said grooves, thereby forming down draft flues; a top wall, comprising a horizontal water chamber having means of communication with the water chamber in said rear wall; side walls, comprising vertical water chambers, each having means of communication with said horizontal water chamber, and an outlet port adapted to be connected to a radiator system; one of said side walls, having valves in the inlet and outlet ports (adapted to trap the water therein) and a water gauge, a pop-off and a steam outlet mounted therein; a front wall, having suitable openings therein, disposed with said rear, top and side walls to form a rectangular chamber; for the purposes set forth.

19. In an equipment of the class described, in combination; a rear wall comprising a vertical water chamber, having an intake port in the base and vertical grooves in the front thereof, an insulation wall disposed in front of said grooves, thereby forming down draft flues; a top wall, comprising a horizontal water chamber having means of communication with the water chamber in said rear wall; side walls, comprising vertical water chambers, each having means of communication with said horizontal water chamber, and an outlet port adapted to be connected to a radiator system; one of said side walls, having valves in the inlet and outlet ports (adapted to trap the water therein) and a water gauge, a pop-off and a steam outlet mounted thereon; a coil, having an intake port at the lower end and an outlet port at the upper end thereof, disposed upwardly within the water chamber in said rear wall and extending into the water chamber in one of said side walls; a front wall, having suitable openings therein, disposed with said rear, top and side walls to form a rectangular chamber; for the purposes set forth.

20. In an equipment of the class described, in combination; a rear wall comprising a vertical water chamber, having an intake port in the base and vertical grooves in the front thereof; an insulation wall disposed in front of said grooves thereby forming down draft flues; a horizontal conduit, having a damper therein, extending through said rear wall; a top wall comprising a horizontal water chamber having means of communication with the water chamber in said rear wall; side walls, comprising vertical water chambers, each having means of communication with said horizontal water chamber, and an outlet port adapted to be connected to a radiator system; one of said side walls, having valves in the inlet and outlet ports (adapted to trap the water therein) and a water gauge, a pop-off and a steam outlet mounted thereon; a coil, having an intake port at the lower end and an outlet port at the upper end thereof, disposed upwardly within the water chamber in said rear wall and extending into the water chamber in one of said side walls; a front wall, having suitable openings therein, disposed with said rear, top and side walls to form a rectangular chamber; for the purposes set forth.

21. In an equipment of the class described, in combination; a rear wall comprising a vertical water chamber, having an intake port in the base and vertical grooves in the front thereof; an insulation wall disposed in front of said grooves, thereby forming down draft flues; a top wall, comprising a horizontal water chamber having means of communication with the water chamber in said rear wall; side walls, comprising vertical water chambers, each having means of communication with said horizontal water chamber, and an outlet port adapted to be connected to a radiator system; a front wall, having suitable openings therein, disposed with said rear, top and side walls to form a rectangular chamber; a box, having extensions at the bottom thereof, disposed within said rectangular chamber, (the sides of said box and said side walls forming vertical channels the top of said box and said top wall forming a horizontal channel and said rear, side and front walls forming a combustion chamber under said box); for the purposes set forth.

22. In an equipment of the class described, in combination; a rear wall comprising a vertical water chamber, having an intake port in the base and vertical grooves in the front thereof; an insulation wall disposed in front of said grooves, thereby forming down draft flues; a top wall, comprising a horizontal water chamber having means of communication with the water chamber in said rear wall; side walls, comprising vertical water chambers, each having means of communication with said horizontal water chamber, and an outlet port adapted to be connected to a radiator system; a coil, having an intake port at the lower end and an outlet port at the upper end therof, disposed upwardly within the water chamber in said rear wall and extending into the water chamber, in one of said side walls; a front wall, having suitable openings therein, disposed with said rear, top and side walls to form a rectangular chamber; a box, having extensions at the bottom thereof, disposed within said rectangular chamber, (the sides of said box and said side walls forming vertical channels, the top of said box and said top wall, forming a horizontal channel and said rear, side and front walls forming a combustion chamber under said box;) for the purposes set forth.

23. In an equipment of the class described, in combination; a rear wall comprising a vertical water chamber, having an intake port in the base and vertical grooves in the front therof; an insulation wall disposed in front of said grooves, thereby forming down draft flues; a horizontal conduit, having a damper therein, extending through said rear wall; a top wall, comprising a horizontal water chamber having means of communication with the water chamber in said rear wall; side walls comprising vertical water chambers, each having means of communication with said horizontal water chamber, and an outlet port adapted to be connected to a radiator system; one of said side walls, having valves in the inlet and outlet ports adapted to trap the water therein) and a water gauge, a pop-off and a steam outlet mounted thereon; a coil, having an intake port at the lower end and an outlet port at the upper end thereof, disposed upwardly within the water chamber in said rear wall and extending into the water chamber in one of said side walls; a front wall, having suitable openings therein, disposed with said rear, top and side walls to form a rectangular chamber; a box, having extensions at the bottom therof, disposed within said rectangular chamber, (the sides of said box and said side walls forming vertical channels, the top of said box and said top wall, forming a horizontal channel and said rear, side and front walls forming a combustion chamber under said box); for the purposes set forth.

24. In an equipment of the class described, in combination; a rear wall comprising a vertical water chamber, having an intake port in the base and vertical grooves in the front thereof; an insulation wall disposed in front of said grooves, thereby forming down draft flues; a horizontal conduit, having a damper therein, extending through said rear wall; a top wall, comprising a horizontal water chamber having means of communication with the water chamber in said rear wall; side walls, comprising vertical water chambers, each having means of communication with said horizontal water chamber, and an outlet port adapted to be connected to a radiator system: one of said side walls, having valves in the inlet and outlet ports (adapted to trap the water therein) and a water gauge, a pop-off and a steam outlet mounted thereon; a front wall, having suitable openings therein, disposed with said rear, top and side walls to form a rectangular chamber; a box, having extensions at the bottom therof, disposed within said rectangular chamber, (the sides of said box and said side walls forming vertical channels, the top of said box and said top wall, forming a horizontal channel and said rear, side and front walls forming a combustion chamber under said box); for the purposes set forth.

25. In an equipment of the class described, in combination; a rear wall comprising a vertical water chamber, having an intake port in the base and vertical grooves in the front thereof; an insulation wall disposed in front of said grooves, thereby forming down draft flues; a top wall, comprising a horizontal water chamber having means of communication with the water chamber in said rear wall; side walls, comprising vertical water chambers, each having means of communication with said horizontal water chamber, and an outlet port adapted to be connected to a radiator system; one of said side walls, having valves in the inlet and outlet ports (adapted to trap the water therein) and a water gauge, a pop-off and a steam outlet mounted thereon; a front wall, having suitable openings therein, disposed with said rear, top and side walls to form a rectangular chamber; a box, having extensions at the bottom thereof, disposed within said rectangular chamber, (the sides of said box and said side walls forming vertical channels, the top of said box and said top wall, forming a horizontal channel and said rear, side and front walls forming a combustion chamber under said box); for the purposes set forth.

26. In an equipment of the class described, in combination; a rear wall comprising a vertical water chamber, having an intake port in the base and vertical grooves in the front thereof; an insulation wall disposed in front of said grooves, thereby forming down draft flues; a top wall, comprising a horizontal water chamber having means of communication with the water chamber in said rear wall; side walls, comprising vertical water chambers, each having means of communication with said horizontal water chamber, and an outlet port adapted to be connected to a radiator system; one of said side walls, having valves in the inlet and outlet ports (adapted to trap the water therein) and a water gauge, a pop-off and a steam outlet mounted thereon; a coil, having an intake port at the lower end and an outlet port at the upper end thereof, disposed upwardly within the water chamber in said rear wall and extending into the water chamber in one of said side walls; a front wall, having suitable openings therein, disposed with said rear, top and side walls to form a rectangular chamber; a box having extensions at the bottom thereof, disposed within said rectangular chamber, (the sides of said box and said side walls forming vertical channels, the top of said box and said top wall, forming a horizontal channel and said rear, side and front walls forming a combustion chamber under said box); for the purposes set forth.

27. In an equipment of the class described, in combination; a rear wall comprising a vertical water chamber, having an intake port in the base and vertical grooves in the front thereof; an insulation wall disposed in front of said grooves, thereby forming down draft flues; a horizontal conduit, having a damper therein, extending through said rear wall; a top wall, comprising a horizontal water chamber having means of communication with the water chamber in said rear wall; side walls, comprising vertical water chambers, each having means of communication with said horizontal water chamber, and an outlet port adapted to be connected to a radiator system; one of said side walls, having valves in the inlet and outlet ports (adapted to trap the water therein) and a water gauge, a pop-off and a steam outlet mounted thereon; a coil, having an intake port at the lower end and an outlet port at the upper end thereof, disposed upwardly within the water chamber in said rear wall and extending into the water chamber in one of said side walls; a front wall, having suitable openings therein, disposed with said rear, top and side walls to form a rectangular chamber; a box having extensions at the bottom thereof, disposed within said rectangular chamber, (the sides of said box and said side walls forming vertical channels, the top of said box and said top wall, forming a horizontal channel and said rear, side and front walls forming a combustion chamber under said box); for the purposes set forth.

28. In an equipment of the class described, in combination; a rear wall comprising a vertical water chamber, having an intake port in the base and vertical grooves in the front thereof; an insulation wall disposed in front of said grooves, thereby forming down draft flues; a top wall, comprising a horizontal water chamber having means of communication with the water chamber in said rear wall; side walls, comprising vertical water chambers, each having means of communication with said horizontal water chamber, and an outlet port adapted to be connected to a radiator system; a coil, having an intake port at the lower end and an outlet port at the upper end thereof, disposed upwardly within the water chamber in said rear wall and extending into the water chamber in one of said side walls; a front wall, having suitable openings therein, disposed with said rear, top and side walls to form a rectangular chamber; a box, having extensions at the bottom thereof, disposed within said rectangular chamber, (the sides of said box and said side walls forming vertical channels, the top of said box and said top wall, forming a horizontal channel and said rear, side and front walls forming a combustion chamber under said box); main doors hinged to the front of said box: for the purposes set forth.

29. In an equipment of the class described, in combination; a rear wall comprising a vertical water chamber, having an intake port in the base and vertical grooves in the front thereof, an insulation wall disposed in front of said grooves, thereby forming down draft flues; a top wall, comprising a horizontal water chamber having means of communication with the water chamber in said rear wall; side walls, comprising vertical water chambers, each having means of communication with said horizontal water chamber, and an outlet port adapted to be connected to a radiator system; a coil, having an intake port at the lower end and an outlet port at the upper end thereof, disposed upwardly within the water chamber in said rear wall and extending into the water chamber in one of said side walls; a front wall, having suitable openings therein, disposed with said rear, top and side walls to form a rectangular chamber; a box, having extensions at the bottom thereof, disposed within said rectangular chamber, (the sides of said box and said side walls forming vertical channels, the top of said box and said top wall, forming a horizontal channel and said rear, side and front walls forming a combustion chamber under said box); main doors hinged to the front of said box; auxiliary doors having notches therein, hinged in said main doors; vertical slides mounted in said main doors, adapted to fit into the notches of said auxiliary doors; for the purposes set forth.

30. In an equipment of the class described, in combination; a rear wall comprising a vertical water chamber, having an intake port in the base and vertical grooves in the front thereof; an insulation wall disposed in front of said grooves, thereby forming down draft flues; a top wall, comprising a horizontal water chamber having means of communication with the water chamber in said rear wall; side walls, comprising vertical water chambers, each having means of communication with said horizontal water chamber, and an outlet port adapted to be connected to a radiator system; a coil, having an intake port at the lower end and an outlet port at the upper end thereof, disposed upwardly within the water chamber in said rear wall and extending into the water chamber in one of said side walls; a front wall, having suitable openings therein, disposed with said rear, top and side walls to form a rectangular chamber; a box, having extensions at the bottom thereof, disposed within said rectangular chamber, (the sides of said box and said side walls forming vertical channels, the top of said box and said top wall, forming a horizontal channel and said rear, side and front walls forming a combustion chamber under said box); a horizontal bar supporting a door, hinged to the front of said box; for the purposes set forth.

31. In an equipment of the class described, in combination; a rear wall comprising a vertical water chamber, having an intake port in the base and vertical grooves in the front thereof; an insulation wall disposed in front of said grooves, thereby forming down draft flues; a top wall, comprising a horizontal water chamber having means of communication with the water chamber in said rear wall; side walls, comprising vertical water chambers, each having means of communication with said horizontal water chamber, and an outlet port adapted to be connected to a radiator system; a front wall, having suitable openings therein, disposed with said rear, top and side walls to form a rectangular chamber; a box, having extensions at the bottom thereof, disposed within said rectangular chamber, (the sides of said box and said side walls forming vertical channels, the top of said box and said top wall, forming a horizontal channel and said rear, side and front walls forming a combustion chamber under said box); dampers, hung within said vertical channels; for the purposes set forth.

32. In an equipment of the class described, in combination; a rear wall comprising a vertical water chamber, having an intake port in the base and vertical grooves in the front thereof; an insulation wall disposed in front of said grooves, thereby forming down draft flues; a top wall, comprising a horizontal water chamber having means of communication with the water chamber in said rear wall; side walls, comprising vertical water chambers, each having means of communication with said horizontal water chamber, and an outlet port adapted to be connected to a radiator system; a front wall, having suitable openings therein, disposed with said rear, top and side walls to form a rectangular chamber; a box, having extensions at the bottom thereof, disposed within said rectangular chamber, (the sides of said box and said side walls forming vertical channels, the top of said box and said top wall, forming a horizontal channel and said rear, side and front walls forming a combustion chamber under said box); grids, mounted on the extensions of said box, adapted to regulate the temperature thereof; grids mounted within said box, forming compartments therein; a fume outlet, extending from said box into an exit conduit; for the purposes set forth.

33. In an equipment of the class described, in combination; a rear wall comprising a vertical water chamber, having an intake port in the base and vertical grooves in the front thereof; an insulation wall disposed in front of said grooves, thereby forming down draft flues; a top wall, comprising a horizontal water chamber having means of communication with the water chamber in said rear wall; side walls, comprising vertical water chambers, each having means of communication with said horizontal water chamber, and an outlet port adapted to be connected to a radiator system; a coil, having an intake port at the lower end and an outlet port at the upper end thereof, disposed upwardly within the water chamber in said rear wall and extending into the water chamber in one of said side walls; a front wall, having suitable openings therein, disposed with said rear, top and side walls to form a rectangular chamber; a box, having extensions at the bottom thereof, disposed within said rectangular chamber, (the sides of said box and said side walls forming vertical channels, the top of said box and said top wall, forming a horizontal channel and said rear, side and front walls forming a combustion chamber under said box); grids, mounted on the extensions of said box, adapted to regulate the temperature thereof; dampers, hung within said vertical channels; grids mounted within said box, forming compartments therein; a fume outlet, extending from said box into an exit conduit; for the purposes set forth.

34. In an equipment of the class described, in combination; a rear wall comprising a vertical water chamber, having an intake port in the base and vertical grooves in the front thereof; an insulation wall disposed in front of said grooves, thereby forming down draft flues; a top wall, comprising a horizontal water chamber having means of communication with the water chamber in said rear wall; side walls, comprising vertical water chambers, each having means of communication with said horizontal water chamber, and an outlet port adapted to be connected to a radiator system; a coil, having an intake port at the lower end and an outlet port at the upper end thereof, disposed upwardly within the water chamber in said rear wall and extending into the water chamber in one of said side walls; a front wall, having suitable openings therein, disposed with said rear, top and side walls to form a rectangular chamber; a box, having extensions at the bottom thereof, disposed within said rectangular chamber, (the sides of said box and said side walls forming vertical channels, the top of said box and said top wall, forming a horizontal channel and said rear, side and front walls forming a combustion chamber under said box); main doors hinged to the front of said box; auxiliary doors hinged in said main doors; for the purposes set forth.

35. In an equipment of the class described, in combination; a rear wall comprising a vertical water chamber, having an intake port in the base and vertical grooves in the front thereof; an insulation wall disposed in front of said grooves, thereby forming down draft flues; a horizontal conduit, having a damper therein, extending through said rear wall; a top wall, comprising a horizontal water chamber having means of communication with the water chamber in said rear wall; side walls, comprising vertical water chambers, each having means of communication with said horizontal water chamber, and an outlet port adapted to be connected to a radiator system; one of said side walls, having valves in the inlet and outlet ports (adapted to trap the water therein) and a water gauge, a pop-off and a steam outlet mounted therein; a box, having extensions at the bottom thereof, disposed within said rectangular chamber, (the sides of said box and said side walls forming vertical channels, the top of said box and said top wall, forming a horizontal channel and said rear, side and front walls forming a combustion chamber under said box); dampers, hung within said vertical channels; for the purposes set forth.

36. In an equipment of the class described, in combination; a rear wall comprising a vertical water chamber, having an intake port in the base and vertical grooves in the front thereof; an insulation wall disposed in front of said grooves, thereby forming down draft flues; a top wall, comprising a horizontal water chamber having means of communication with the water chamber in said rear wall; side walls, comprising vertical water chambers, each having means of communication with said horizontal water chamber, and an outlet port adapted to be connected to a radiator system; a front wall, having suitable openings therein, disposed with said rear, top and side walls to form a rectangular chamber; a box, having extensions at the bottom thereof, disposed within said rectangular chamber, (the sides of said box and said side walls forming vertical channels, the top of said box and said top wall, forming a horizontal channel and said rear, side and front walls forming a combustion chamber under said box); main doors hinged to the front of said box; auxiliary doors, having notches therein, hinged in said main doors; vertical slides mounted in said main doors, adapted to fit into the notches of said auxiliary doors; a horizontal bar, supporting a door, hinged to the front of said box; for the purposes set forth.

37. In an equipment of the class described, in combination; a rear wall comprising a vertical water chamber, having an intake port in the base and vertical grooves in the front thereof; an insulation wall disposed in front of said grooves, thereby forming down draft flues; a top wall, comprising a horizontal water chamber having means of communication with the water chamber in said rear wall; side walls, comprising vertical water chambers, each having means of communication with said horizontal water chamber, and an outlet port adapted to be connected to a radiator system; a front wall, having suitable openings therein, disposed with said rear, top and side walls to form a rectangular chamber; a box, having extensions at the bottom thereof, disposed within said rectangular chamber, (the sides of said box and said side walls forming vertical channels, the top of said box and said top wall, forming a horizontal channel and said rear, side and front walls forming a combustion chamber under said box); dampers, hung within said vertical channels; main doors hinged to the front of said box; auxiliary doors, having notches therein, hinged in said main doors; vertical slides mounted in said main doors, adapted to fit into the notches of said auxiliary doors; a horizontal bar, supporting a door, hinged to the front of said box; for the purposes set forth.

38. In an equipment of the class described, in combination; a rear wall comprising a vertical water chamber, having an intake port in the base and vertical grooves in the front thereof; an insulation wall disposed in front of said grooves, thereby forming down draft flues; a top wall, comprising a horizontal water chamber having means of communication with the water chamber in said rear wall; side walls, comprising vertical water chambers, each having means of communication with said horizontal water chamber, and an outlet port adapted to be connected to a radiator system; a front wall, having suitable openings therein, disposed with said rear, top and side walls to form a rectangular chamber; a box, having extensions at the bottom thereof, disposed within said rectangular chamber, (the top of said box and said top wall, forming a horizontal channel and said rear, side and front walls forming a combustion chamber under said box); dampers, hung within said vertical channels; a fume outlet, extending from said box into an exit conduit; for the purposes set forth.

39. In an equipment of the class described, in combination; a rear wall comprising a vertical water chamber, having an intake port in the base and vertical grooves in the front thereof; an insulation wall disposed in front of said grooves thereby forming down draft flues; a top wall, comprising a horizontal water chamber having means of communication with the water chamber in said rear wall; side walls, comprising vertical water chambers, each having means of communication with said horizontal water chamber, and an outlet port adapted to be connected to a radiator system; a coil, having an intake port at the lower end and an outlet port at the upper end thereof, disposed upwardly within the water chamber in said rear wall and extending into the water chamber in one of said side walls; a front wall, having suitable openings therein, disposed with said rear, top and side walls to form a rectangular chamber; a box, having extensions at the bottom thereof, disposed within said rectangular chamber, (the sides of said box and said side walls forming vertical channels, the top of said box and said top wall, forming a horizontal channel and said rear, side and front walls forming a combustion chamber under said box); dampers, hung within said vertical channels; a fume outlet, extending from said box into an exit conduit; for the purposes set forth.

40. In an equipment of the class described, in combination; a rear wall comprising a vertical water chamber having an intake port in the base and vertical grooves in the front thereof; an insulation wall disposed in front of said grooves, thereby forming down draft flues; a horizontal conduit, having a damper therein, extending through said rear wall; a top wall, comprising a horizontal water chamber having means of communication with the water chamber in said rear wall; side walls, comprising vertical water chambers, each having means of communication with said horizontal water chamber, and an outlet port adapted to be connected to a radiator system; one of said side walls, having valves in the inlet and outlet ports (adapted to trap the water therein) and a water gauge, a pop-off and a steam outlet mounted therein; a coil, having an intake port at the lower end and an outlet port at the upper end thereof, disposed upwardly within the water chamber in said rear wall and extending into the water chamber in one of said side walls; a front wall, having suitable openings therein, disposed with said rear, top and side walls to form a rectangular chamber; a box, having extensions at the bottom thereof, disposed within said rectangular chamber, (the sides of said box and said side walls forming vertical channels, the top of said box and said top wall, forming a horizontal channel and said rear, side and front walls forming a combustion chamber under said box); grids, mounted on the extensions of said box, adapted to regulate the temperature thereof; dampers, hung within said vertical channels; main doors hinged to the front of said box; auxiliary doors, having notches therein, hinged in said main doors; vertical slides mounted in said main doors, adapted to fit into the notches of said auxiliary doors; a horizontal bar, supporting a door, hinged to the front of said box; grids mounted within said box, forming compartments therein; a fume outlet, extending from said box into an exit conduit; for the purposes set forth.

OLIVER S. BOWMAN.